Nov. 17, 1964     M. FERRARI     3,157,719

PRODUCTION OF VACUUM-SHAPED ARTICLES OF POLYPROPYLENE

Filed April 2, 1958

INVENTOR
MARCO FERRARI

BY Maurice B. Stiefel

ATTORNEY.

United States Patent Office 3,157,719
Patented Nov. 17, 1964

3,157,719
PRODUCTION OF VACUUM-SHAPED ARTICLES OF POLYPROPYLENE
Marco Ferrari, Milan, Italy, assignor to Montecatini Società Generale per l'Industria Mineraria e Chimica, Milan, Italy
Filed Apr. 2, 1958, Ser. No. 725,809
Claims priority, application Italy Apr. 11, 1957
2 Claims. (Cl. 264—92)

This invention relates to a method for producing shaped articles of a propylene polymerizate consisting prevailingly of isotactic polypropylene. More particularly, the invention relates to producing such articles by the vacuum shaping of sheets of the polypropylene.

Sheets of thermoplastic resins have been shaped by placing the flat sheet in a mold having the desired shape, and heating the sheet in the mold to the softening point of the resin so that, due to the vacuum created between the sheet and the mold, the sheet assumes, and on cooling is set in, the shape of the mold.

Recently, G. Natta et al. have disclosed new solid polymers of propylene comprising a stereoregular structure which Natta has termed "isotactic" (see, e.g., the communication to the editor of JACS by Natta et al. received in the United States on December 10, 1954, published in JACS of March 20, 1955), and which is characterized in that, assuming the polymer main chain to be fully extended in a plane, the $CH_3$— groups attached to the tertiary asymmetric carbon atoms of adjacent monomeric units are on one side of the main chain of the polymer and the hydrogen atoms bound to those carbon atoms are on the opposite side of the chain. The isotactic polymers are crystallizable and under appropriate conditions are crystalline. Polypropylene having a high content of isotactic macromolecules is highly crystalline under the appropriate conditions.

Sheets of polypropylene consisting at least prevailingly (over 60%) of isotactic macromolecules can be obtained by extrusion of the polymer melt or by casting a solution of the polymer onto a suitable supporting surface and evaporating the solvent.

I have now found that the sheets of polypropylene consisting at least prevailingly of isotactic macromolecules cannot be vacuum shaped by the above mentioned method, because by heating the propylene polymer sheets in the mold to the softening point of the resin, undulations are formed, thus leading to non-homogeneous heating of the material (because of the resulting non-uniform distance of the resin surface from the heating source). During the following shaping operation this causes an irregular stretching of the sheet, with consequent possible perforation at the points of highest temperature.

I have now surprisingly found that, if a sheet of polypropylene consisting at least prevailingly of isotactic macromolecules, before being fixed in the frame, is subjected for a short period, to a preliminary heat treatment, at a temperature of about 130–140° C. said undulation is avoided and the sheet can then be shaped without the mentioned inconveniences.

The invention provides accordinlgly a process for making shaped articles from sheets of polypropylene consisting at least prevailingly of isotactic macromolecules, which comprises preheating for 2 or 3 minutes the polypropylene sheet to a temperature below its softening point, placing the sheet over the mold, heating the sheet to the softening point of the polypropylene, and applying vacuum between the sheet and the inner surface of the mold to force the sheet to conform to and take the shape of the mold.

Said preheating is carried out according to the invention, to a temperature of about 130 to 140° C.

Because of the high mechanical strength of the polypropylene sheets, it is possible to use thinner, less costly sheets as starting material in the vacuum shaping process, and to obtain very strong, thin-walled articles. At the same time, the inherently glossy surface of the articles makes them more appealing and aesthetically attractive than articles which are vacuum shaped from sheets of other thermoplastic resins.

In addition to the high mechanical strength of the articles obtained by vacuum shaping the prevailingly isotactic polypropylene sheet, those articles also have the very desirable properties of unbreakability, exceptionally high resistance to heat, transparency, the capacity to be produced in light or transparent colors, chemical inertness, insulating power, absence of smell and toxicity, and an extraordinary brightness (high gloss).

This combination of characteristics is peculiar to the vacuum shaped prevailingly isotactic polypropylene articles of this invention and is not possessed by articles obtained by vacuum shaping sheets of other thermoplastic resins.

As Natta et al. have shown, isotactic polypropylene can have a molecular weight as high as 800,000 and above, and may be substantially composed of isotactic macromolecules and be highly crystalline. However, in making the sheets to be vacuum shaped in accordance with this invention, it is generally preferred to use polypropylenes having a molecular weight between 50,000 and 250,000 and an isotactic content of 60% to 80%. These characteristics of the polypropylene are not strictly limitations on the propylene polymers which can be formed into sheets suitable for vacuum shaping.

Articles made by vacuum shaping sheets of polypropylene having a molecular weight and isotactic content in the preferred ranges have been found to have, in general, the following average characteristics:

Tensile yield point _____ 400 kg./cm².
Elongation at yield point _____ 100–600%.
Brinell hardness (determined with a ½"
  sphere for 1 min; charge: 70 pounds) ___ 1,500–2,000.
Softening point (Vicat, charge 5 kg.) _____ 100–110° C.

The propylene polymers which are formed into the starting sheets can be modified by the inclusion therein of dyes, pigments and fillers which do not modify the softening point of the polypropylene. Since fillers of some given types may change the polymer softening point, it is advisable to test the behaviour of the fillers in small scale runs before proceeding with large scale operations.

My invention is schematically illustrated in the accompanying drawing wherein.

Figure 1:
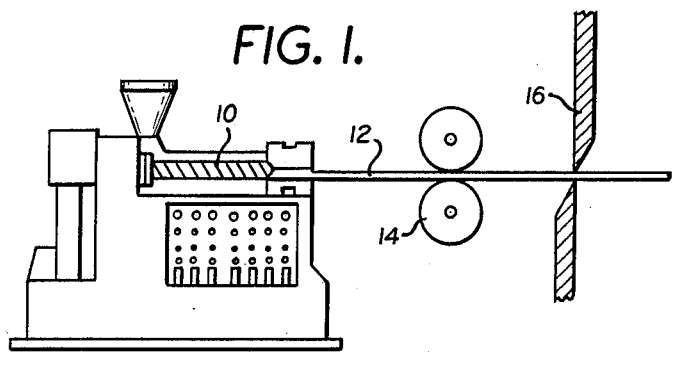
FIG. 1 shows the extrusion and cutting of a polypropylene sheet.
Figure 2:
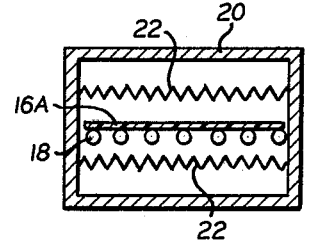
FIG. 2 shows a preheating furnace used to preheat the sheet of polypropylene.

As shown in FIG. 1, the extruder 10 extrudes polypropylene in sheet form 12. The sheet passes through forwarding rolls 14 and is cut by cutters 16. Referring to FIG. 2, the thus cut sheet 16A is placed upon supporting rolls 18 in preheating furnace 20 equipped with electrical heaters 22. The sheet 16A rests loosely and relaxedly upon supporting rolls 18 while it is heated at a temperature of from about 130 to 140° C.

Figure 3:
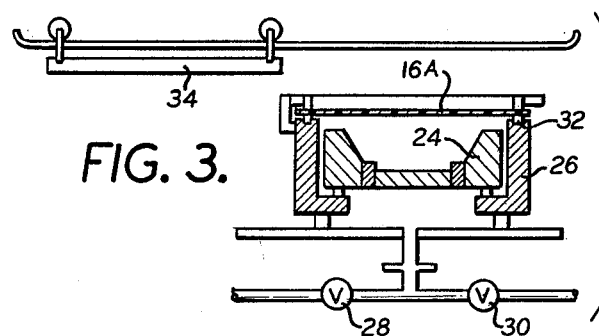
FIG. 3 shows the mold and heater used in the vacuum forming operation.
Figure 4:
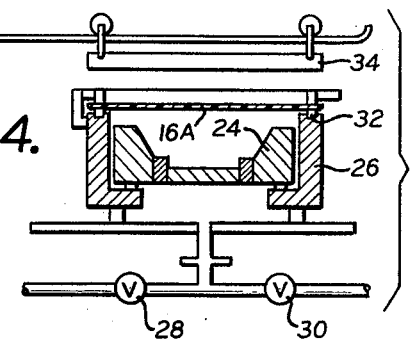
FIG. 4 shows the polypropylene sheet clamped in the mold and the heater disposed directly thereabove.
Figure 6:
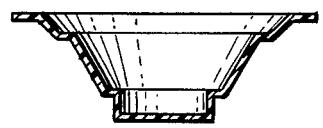
FIG. 6 shows the finished vacuum-formed polypropylene article.
Figure 5:
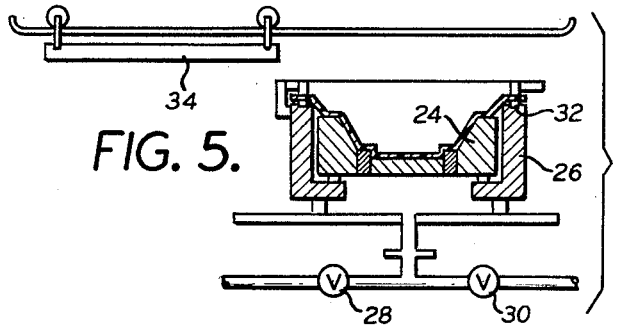
FIG. 5 shows the evacuation of the mold and the resultant conforming of the polypropylene sheet to the mold cavity.

The heated sheet 16A is then transferred to the vacuum forming apparatus shown in FIG. 3. This apparatus includes the mold 24, mold housing 26, vacuum valve 28, and release valve 30. As shown in FIG. 3, the sheet 16A is placed upon gasket 32 and clamped in position. Heater 34 (FIG. 3) is then moved to a position directly over sheet 16A (FIG. 4), the sheet is heated to the softening temperature of the polypropylene, and a vacuum is applied. This causes the sheet to conform to the interior surface of the mold (FIG. 5). The resulting vacuum-formed article is then removed from the mold, the finished article being shown in FIG. 6.

The following example is given to illustrate the invention, it being understood that this example is not intended to be limiting.

*Example*

A 2 mm. thick sheet of a propylene polymerizate prevailingly consisting of isotactic macromolecules having an average molecular weight of 100,000 is introduced into a vacuum molding machine provided with a mold having the shape of the inside wall of a refrigerator door.

The sheet is preheated in the frame, without being fixed (in a loose state) for a period of 2–3 minutes to a temperature of about 130 to 140° C.

After this period the sheet is heated in the mold to its softening point by means of an infra-red light source.

The pump for creating vacuum between the sheet and the mold is then set in operation. Practically instantaneously, the sheet is forced against the mold and assumes the shape thereof.

The sheet is cooled, removed from the mold and taken to a cutting press which trims the edge resulting in a finished piece.

Articles of various shapes can be obtained, depending on the particular shape of the mold which is used. Vacuum-formed pieces of the isotactic polypropylene can be used in food packaging. For example, a food container may be formed in the shape of a shallow tray which, after filling, is covered with a film of the polypropylene or with a polypropylene-cellophane laminate. The cover may be heat-sealed on, or adhered to the container by means of a pressure sensitive adhesive. Cut chicken, small cuts of meat, fish fillets, "TV" dinners, and many other items can be packaged in the manner described.

The container may be a "naked egg" package in which shelled eggs are placed in a tray and sealed.

The food packaged in containers vacuum-shaped from the prevailingly isotactic polypropylene sheet keeps better, the shipping problems are simplified, and the contents of the package are available for easy inspection.

The polypropylene sheets can be drawn very deeply due to their high mechanical strength and, as shown by the example, liners for refrigerator doors can be made successfully. Other items which may be made from the polypropylene sheets by vacuum forming in accordance with this invention, include advertising signs, lighting diffusers, display fixtures, etc.

Since these and other variations in details may be made in practicing the invention without departing from the spirit thereof, we intend to include in the scope of the appended claims all such modifications as may be apparent to those skilled in the art.

What is claimed is:

1. A process for making a shaped article from a sheet of polypropylene consisting prevailingly of isotactic macromolecules, which process comprises preheating the sheet without holding the sheet in a rigidly fixed condition and while the sheet is in relatively loose, substantially tension-free condition, for from about 2 to 3 minutes at a temperature of from about 130–140° C., placing the sheet over a mold, heating the sheet to the softening temperature of the ploypropylene, applying a vacuum between the sheet and the inner surface of the mold to thereby cause the sheet to conform to and take the shape of the mold, and thereafter cooling the shaped sheet.

2. A process for making a shaped article from a flat sheet of polypropylene having an average molecular weight of from about 50,000 to 250,000 and an isotactic macromolecules content of from about 60 to 80%, said sheet having a thickness of about 2 millimeters, which process comprises preheating the sheet without holding the sheet in a rigidly fixed condition and while the sheet is in relatively loose, substantially tension-free condition, for from about 2 to 3 minutes at a temperature of from about 130–140° C., placing the sheet over a mold, heating the sheet to the softening temperature of the polypropylene, applying a vacuum between the sheet and the inner surface of the mold to thereby cause the sheet to conform to and take the shape of the mold, and thereafter cooling the shaped sheet.

References Cited in the file of this patent

UNITED STATES PATENTS

| | | |
|---|---|---|
| 1,586,850 | Smith | June 1, 1926 |
| 2,493,439 | Braund | Jan. 3, 1950 |
| 2,521,388 | Maynard et al. | Sept. 5, 1950 |
| 2,690,593 | Abercrombie | Oct. 5, 1954 |
| 2,702,411 | Winstead | Feb. 22, 1955 |
| 2,713,697 | Willcox | July 26, 1955 |
| 2,736,064 | Rubin | Feb. 28, 1956 |
| 2,836,852 | Butzko | June 3, 1958 |
| 2,847,706 | Hawkins | Aug. 19, 1958 |
| 2,917,783 | Olson et al. | Dec. 22, 1959 |
| 2,926,385 | Willson | Mar 1, 1960 |

OTHER REFERENCES

"Vacuum Forming," published in Modern Plastics, vol. 31, No. 9, May 1954, pp. 90–91.

Plastics Engineering Handbook (Soc. of the Plastics Ind.), published by Reinhold Pub. Corp., New York, 1954, pp. 90–101.

UNITED STATES PATENT OFFICE
CERTIFICATE OF CORRECTION

Patent No. 3,157,719                            November 17, 1964

Marco Ferrari

It is hereby certified that error appears in the above numbered patent requiring correction and that the said Letters Patent should read as corrected below.

In the grant, line 1, for "Marco Farrari" read -- Marco Ferrari --; column 2, line 30, for "are not strictly" read -- and not strictly critical --.

Signed and sealed this 6th day of April 1965.

(SEAL)
Attest:

ERNEST W. SWIDER                                        EDWARD J. BRENNER
Attesting Officer                                          Commissioner of Patents